United States Patent
Mislak et al.

(10) Patent No.: US 10,323,869 B2
(45) Date of Patent: Jun. 18, 2019

(54) COMBINED SUCTION HEADER AND ACCUMULATOR UNIT

(71) Applicant: Johnson Controls Technology Company, Milwaukee, WI (US)

(72) Inventors: Nicholas P. Mislak, Bel Air, MD (US); Douglas A. Kester, York, PA (US)

(73) Assignee: Johnson Control Technology Company, Auburn Hills, MI (US)

( * ) Notice: Subject to any disclaimer, the term of this patent is extended or adjusted under 35 U.S.C. 154(b) by 9 days.

(21) Appl. No.: 15/655,584

(22) Filed: Jul. 20, 2017

(65) Prior Publication Data
US 2018/0094842 A1  Apr. 5, 2018

Related U.S. Application Data

(60) Provisional application No. 62/404,676, filed on Oct. 5, 2016.

(51) Int. Cl.
*F25B 43/00* (2006.01)
*F25B 39/02* (2006.01)
(Continued)

(52) U.S. Cl.
CPC ............ *F25B 43/006* (2013.01); *F25B 39/02* (2013.01); *F25B 41/00* (2013.01); *F25B 1/053* (2013.01);
(Continued)

(58) Field of Classification Search
CPC .... F25B 43/006; F25B 41/00; F25B 2400/03; F25B 2700/2113; F25B 2500/18
(Continued)

(56) References Cited

U.S. PATENT DOCUMENTS 5,233,842 A * 8/1993 Manning ............... F25B 43/006
                                                                 62/132
5,787,728 A * 8/1998 Das ........................ F25B 43/006
                                                                 62/503
(Continued)

FOREIGN PATENT DOCUMENTS

JP    09196511 A  *  7/1997
JP    09196511 A  *  7/1997

OTHER PUBLICATIONS

Yoshioka, Masuo, JP 09196511 A, Refrigerator, Jul. 1997, European Patent Office, English Translation.*
(Continued)

*Primary Examiner* — Frantz F Jules
*Assistant Examiner* — Steve S Tanenbaum
(74) *Attorney, Agent, or Firm* — Fletcher Yoder, P.C.

(57) ABSTRACT

A combined suction header and accumulator for a refrigeration system is described that may protect a compressor from refrigerant liquid entering the compressor while reducing superheat used to evaporate the refrigerant. The combined suction header and accumulator unit for a refrigeration system includes a suction header coupled to an exit side of an evaporator. The suction header includes a main body and receives a flow of refrigerant from the evaporator. The flow of refrigerant includes a liquid portion and a vapor portion. The combined suction header and accumulator unit includes a liquid accumulator disposed within the main body of the suction header. The liquid accumulator blocks the liquid portion of the flow of refrigerant from exiting the main body.

19 Claims, 7 Drawing Sheets

(51) Int. Cl.
*F25B 41/00* (2006.01)
*F25B 1/053* (2006.01)

(52) U.S. Cl.
CPC . *F25B 2600/0253* (2013.01); *F25B 2600/112* (2013.01); *Y02B 30/741* (2013.01); *Y02B 30/743* (2013.01)

(58) Field of Classification Search
USPC .......................................................... 62/503
See application file for complete search history.

(56) References Cited

U.S. PATENT DOCUMENTS

| | | |
|---|---|---|
| 6,449,967 B1 | 9/2002 | Dubé |
| 6,983,613 B2 | 1/2006 | Dubé |
| 7,475,565 B2 | 1/2009 | Esslinger |
| 9,145,880 B2 | 9/2015 | Ellis |
| 2002/0095949 A1* | 7/2002 | Coyle .................... B01D 53/26 62/503 |
| 2006/0153699 A1 | 7/2006 | Gittoes |
| 2008/0127666 A1* | 6/2008 | Major .................. B60H 1/3227 62/244 |
| 2008/0190122 A1* | 8/2008 | Huff ........................ F25B 9/008 62/118 |
| 2016/0245567 A1 | 8/2016 | Austin, Jr. |

OTHER PUBLICATIONS

Yoshioka, Masuo, JP 09196511 A, Refrigerator, Jul. 1997, European Patent Office, English Translation (Year: 1997).*

* cited by examiner

COMBINED SUCTION HEADER AND ACCUMULATOR UNIT

CROSS REFERENCE TO RELATED APPLICATIONS

This application claims priority from and the benefit of U.S. Provisional Application Ser. No. 62/404,676, entitled "INTEGRATED SUCTION HEADER ACCUMULATOR," filed Oct. 5, 2016, which is incorporated by reference in its entirety for all purposes.

BACKGROUND

The present disclosure relates generally to refrigeration, air conditioning, and chilled liquid systems. Specifically, the present disclosure relates to a combined suction header and accumulator used in a refrigeration and/or air conditioning system.

A wide range of applications exists for heating, ventilation, air conditioning, and refrigeration (HVAC&R) systems. For example, residential, commercial, and industrial systems are used to control temperatures and air in residences and buildings using a fluid, such as a refrigerant. The HVAC&R systems may circulate the refrigerant through a closed loop between an evaporator where the refrigerant absorbs heat and a condenser where the refrigerant releases heat. As an example, the refrigerant may absorb heat from a first location and expel the heat in a second location to cool the first location. The refrigerant may be evaporated into a vapor by the evaporator that absorbs the heat from the first location. The compressor may then compress the vapor to cause the pressure and/or temperature of the vapor to rise for subsequent cooling at the second location, thereby moving heat from the first location to the second location.

However, because the compressor may be designed to receive primarily or entirely vapor, the refrigerant may be superheated to protect the compressor. Further, a suction accumulator may be added to protect the compressor from liquid refrigerant. Because the suction accumulator is a separate component that may be included between the evaporator and the compressor, the suction accumulator may add additional complexity and cost to the HVAC&R system.

BRIEF SUMMARY

In one embodiment, a combined suction header and accumulator unit for a refrigeration system includes a suction header coupled to an exit side of an evaporator. The suction header includes a main body, and the suction header is receives a flow of refrigerant from the evaporator. The flow of refrigerant comprises a liquid portion and a vapor portion. The combined suction header and accumulator unit includes a liquid accumulator disposed within the main body of the suction header. The liquid accumulator is blocks the liquid portion of the flow of refrigerant from exiting the main body.

In another embodiment, a refrigeration system includes a condenser and an evaporator coupled to the condenser. The evaporator evaporates a refrigerant from a liquid into a vapor. The refrigeration system includes a combined suction header and accumulator unit coupled to a refrigerant exit side of the evaporator. The combined suction header and accumulator unit includes a main body coupled to the evaporator and extending a length of the evaporator. The main body defines an inner volume that receives the refrigerant from the evaporator. The combined suction header and accumulator unit includes an accumulator that blocks a liquid portion of the refrigerant from exiting the main body. The accumulator is disposed within the main body. The refrigeration system includes a compressor that receives the refrigerant from an outlet of the combined suction header and accumulator unit and compresses the refrigerant from a lower pressure to a higher pressure.

In another embodiment, a refrigeration system includes an evaporator that evaporates a refrigerant from a liquid into a vapor and to output the refrigerant via a plurality of outlets. The refrigeration system includes a body that has a suction header coupled to the plurality of outlets of the evaporator via a respective plurality of inlets of the suction header. The body includes a suction accumulator that blocks a liquid portion of the refrigerant received from the evaporator from exiting the suction accumulator.

DETAILED DESCRIPTION

The present disclosure is directed to a refrigeration system that includes a combined suction header and accumulator. Refrigeration systems typically include an evaporator and a compressor. The evaporator evaporates a refrigerant from a liquid to a vapor by splitting the flow of refrigerant along several refrigeration circuits of the evaporator that each include separate piping. Further, the evaporator may include several outlets from the separate piping of each of the refrigeration circuits. To address this, the evaporator may be coupled to a suction header that merges the separate piping of each of the refrigeration circuits and provides a single outlet of the refrigerant to pass from the evaporator toward the compressor.

The vapor refrigerant may be provided to the compressor to compress the vapor refrigerant from a lower pressure to a higher pressure. However, compressors may be designed to receive a vapor refrigerant and not a liquid refrigerant. Providing too much liquid to the compressor may cause the compressor to operate at a reduced level or prevent the compressor from operating. To address this, the single outlet of the suction header may be coupled to an inlet of a suction accumulator that blocks liquid refrigerant from flowing to the compressor. However, including both a suction header with a first body that merges the refrigerant and a suction accumulator with a second body that protects the compressor may increase complexity of the system as well as reduce efficiency of the evaporator due to additional heating because of the additional connections. As described below, a combined suction header and accumulator may include a suction header that merges the refrigerant from the separate piping of each of the refrigeration circuits. Further, the combined suction header and accumulator may include an accumulator that protects the compressor. The combined suction header and the accumulator may be included in the same body.

Figure 1:
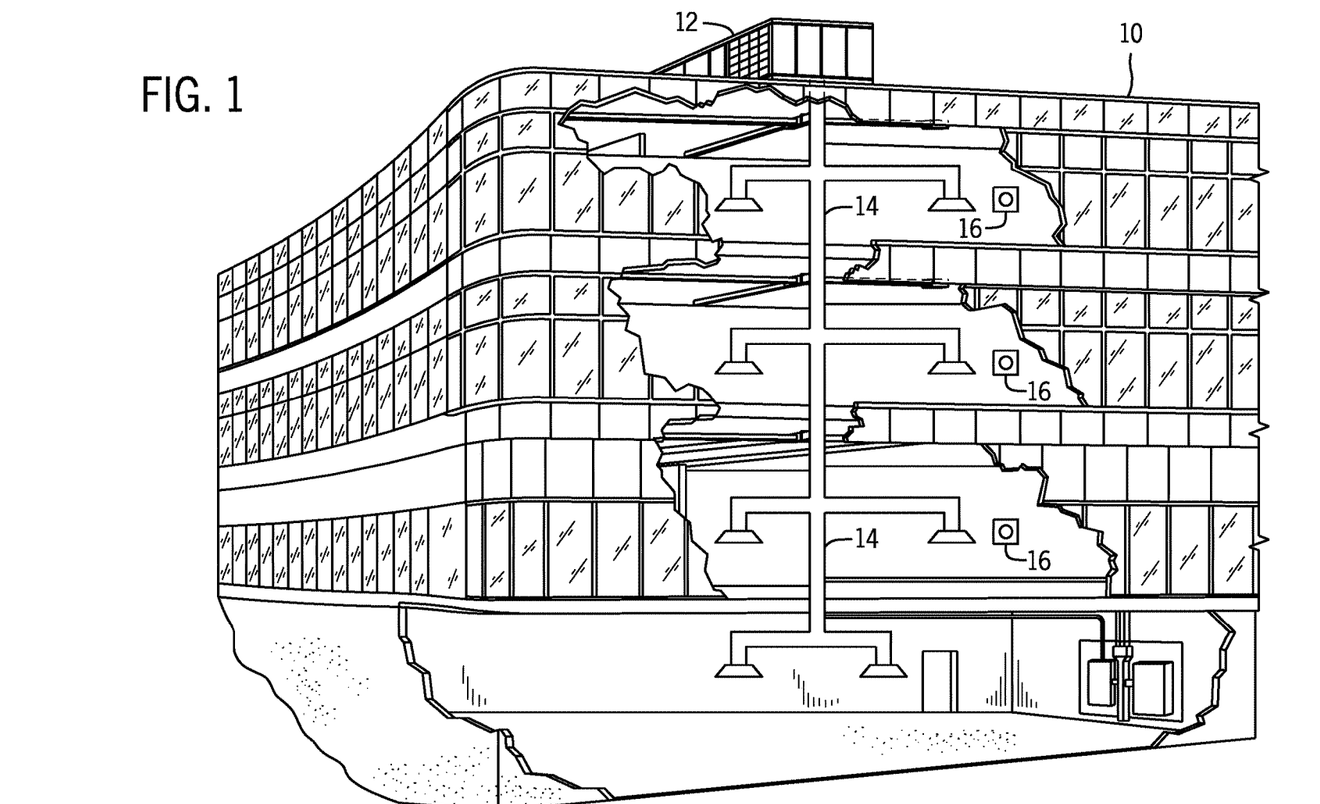
FIG. 1 illustrates a heating, ventilating, and air conditioning (HVAC) system for building environmental management that may employ one or more HVAC units, in accordance with an embodiment of the present disclosure.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
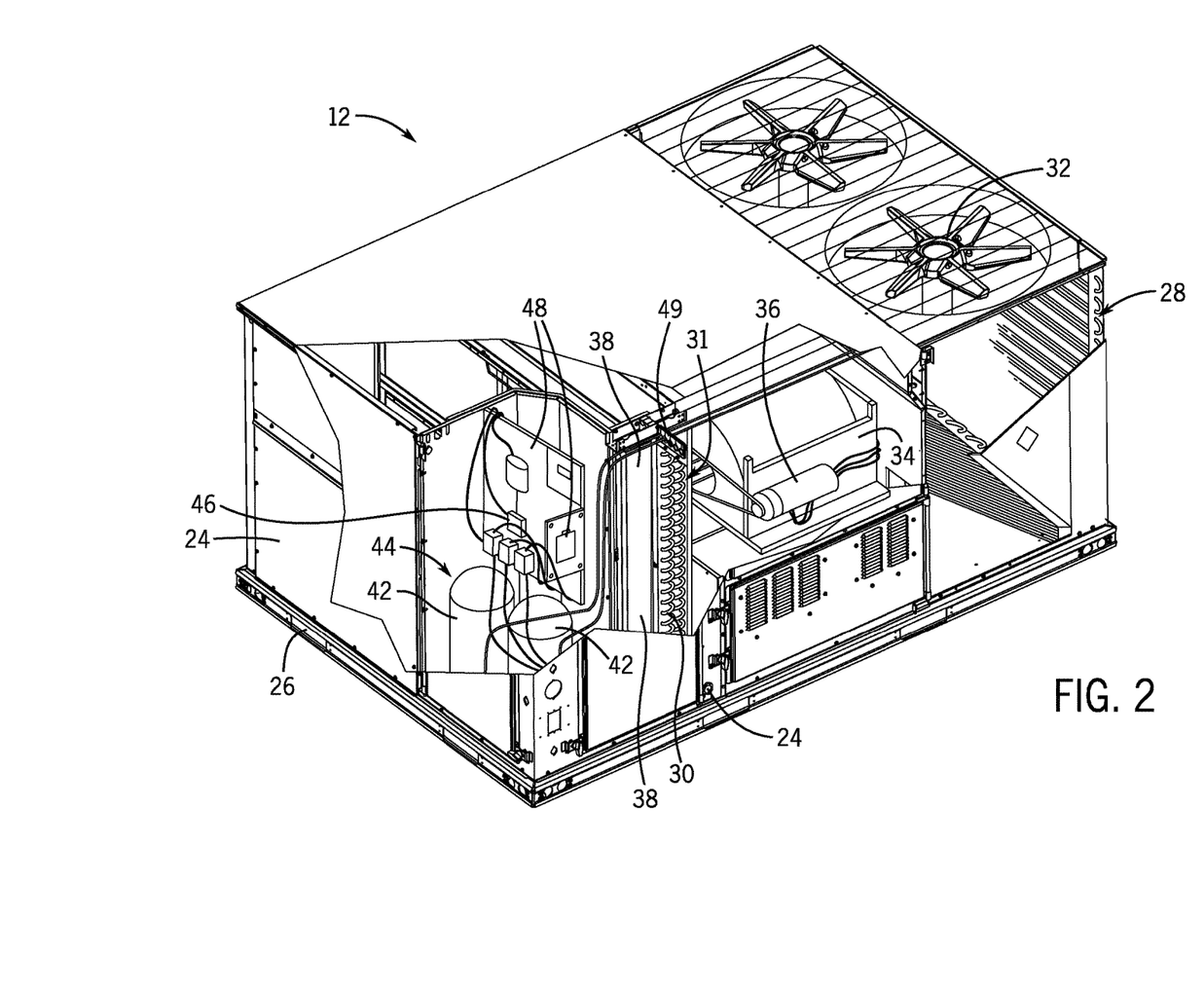
FIG. 2 is a perspective view of an HVAC unit of the HVAC system of FIG. 1, in accordance with an embodiment of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant (for example, R-410A, steam, or water) through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms (one or more being referred to herein separately or collectively as the control device 16). The control circuitry may be configured to control operation of the equipment, provide alarms, and monitor safety switches. Wiring 49 may connect the control board 48 and the terminal block 46 to the equipment of the HVAC unit 12.

Figure 3:
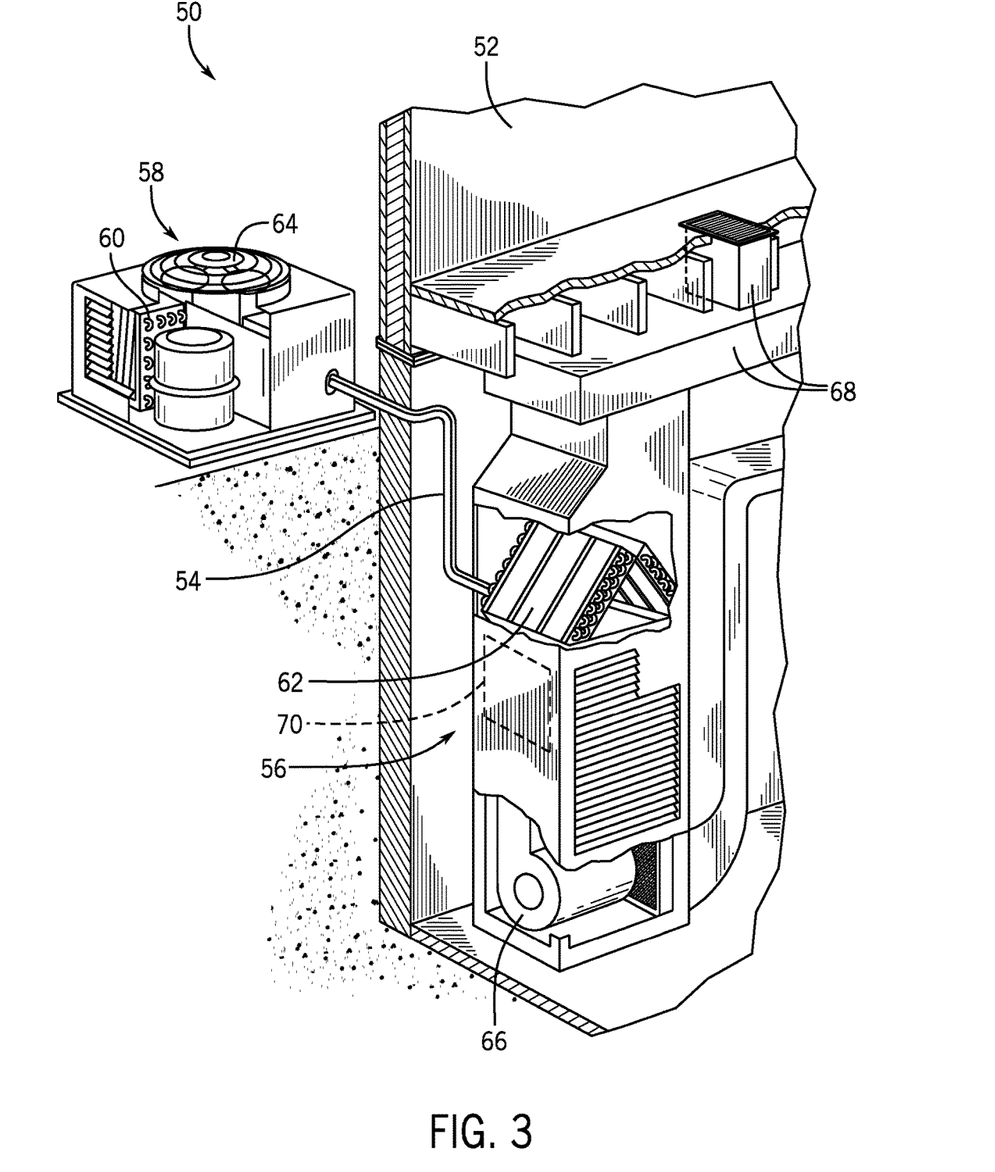
FIG. 3 illustrates a residential heating and cooling system, in accordance with an embodiment of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant (which may be expanded by an expansion device, not shown) and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower 66 or fan that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat (plus a small amount), the residential heating and cooling system 50 may become operative to refrigerate additional air for circulation through the residence 52. When the temperature reaches the set point (minus a small amount), the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace system 70 where it is mixed with air and combusted to form combustion products. The combustion products may pass through tubes or piping in a heat exchanger (that is, separate from heat exchanger 62), such that air directed by the blower 66 passes over the tubes or pipes and extracts heat from the combustion products. The heated air may then be routed from the furnace system 70 to the ductwork 68 for heating the residence 52.

Figure 4:
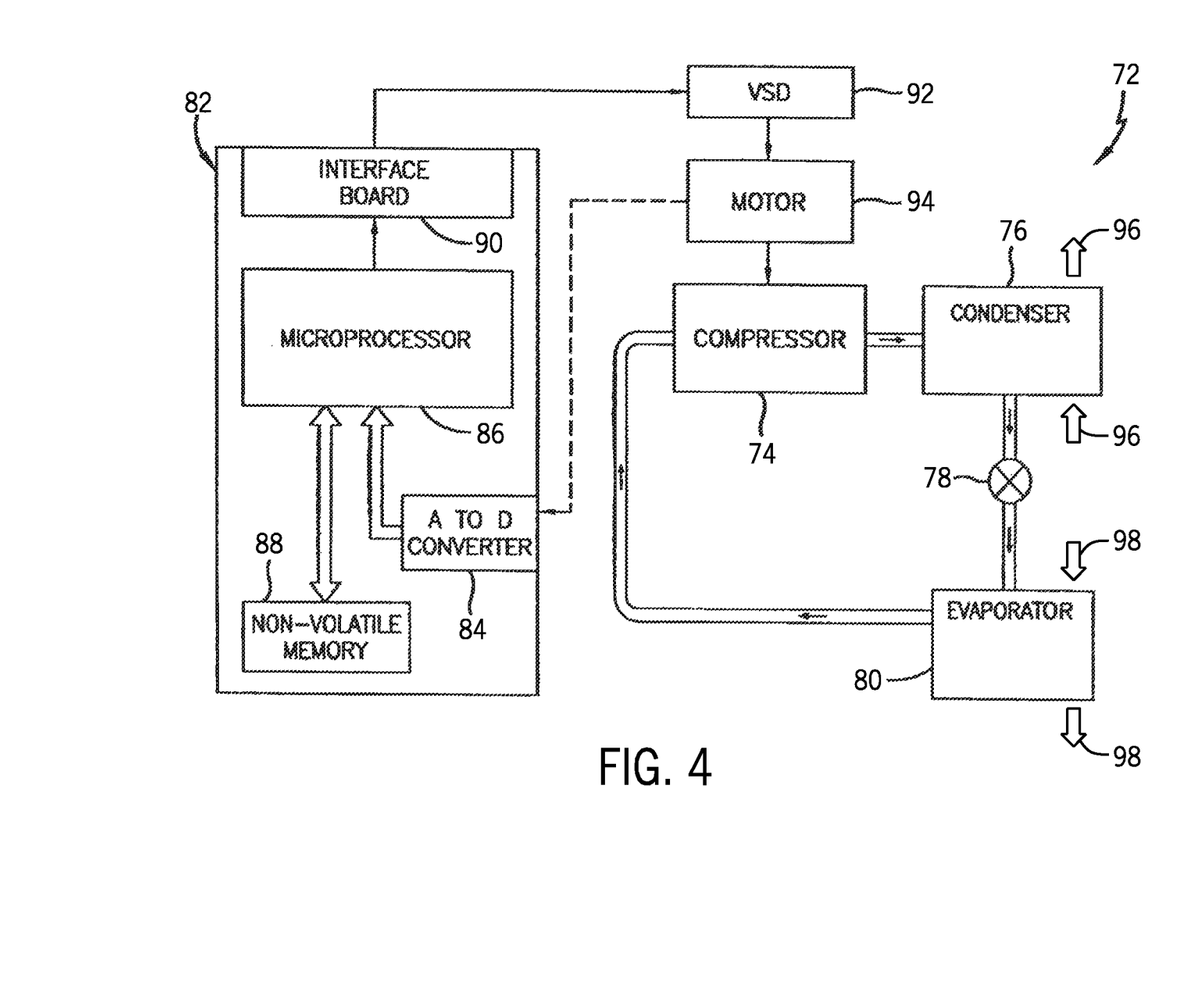
FIG. 4 illustrates a vapor compression system that may be used in the HVAC system of FIG.1 and in the residential heating and cooling system of FIG. 3, in accordance with an embodiment of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications. As an example, a refrigeration (e.g., vapor compression) system 150 that uses a combined suction header and accumulator between the evaporator and the condenser is described below. The combined suction header and accumulator may reduce a number of parts used in the refrigeration system 150 by combining the suction header on an evaporator and the accumulator into the same body. Using a combined suction header and accumulator may reduce complexity as well as improve efficiency of the refrigeration system 150.

Figure 5:
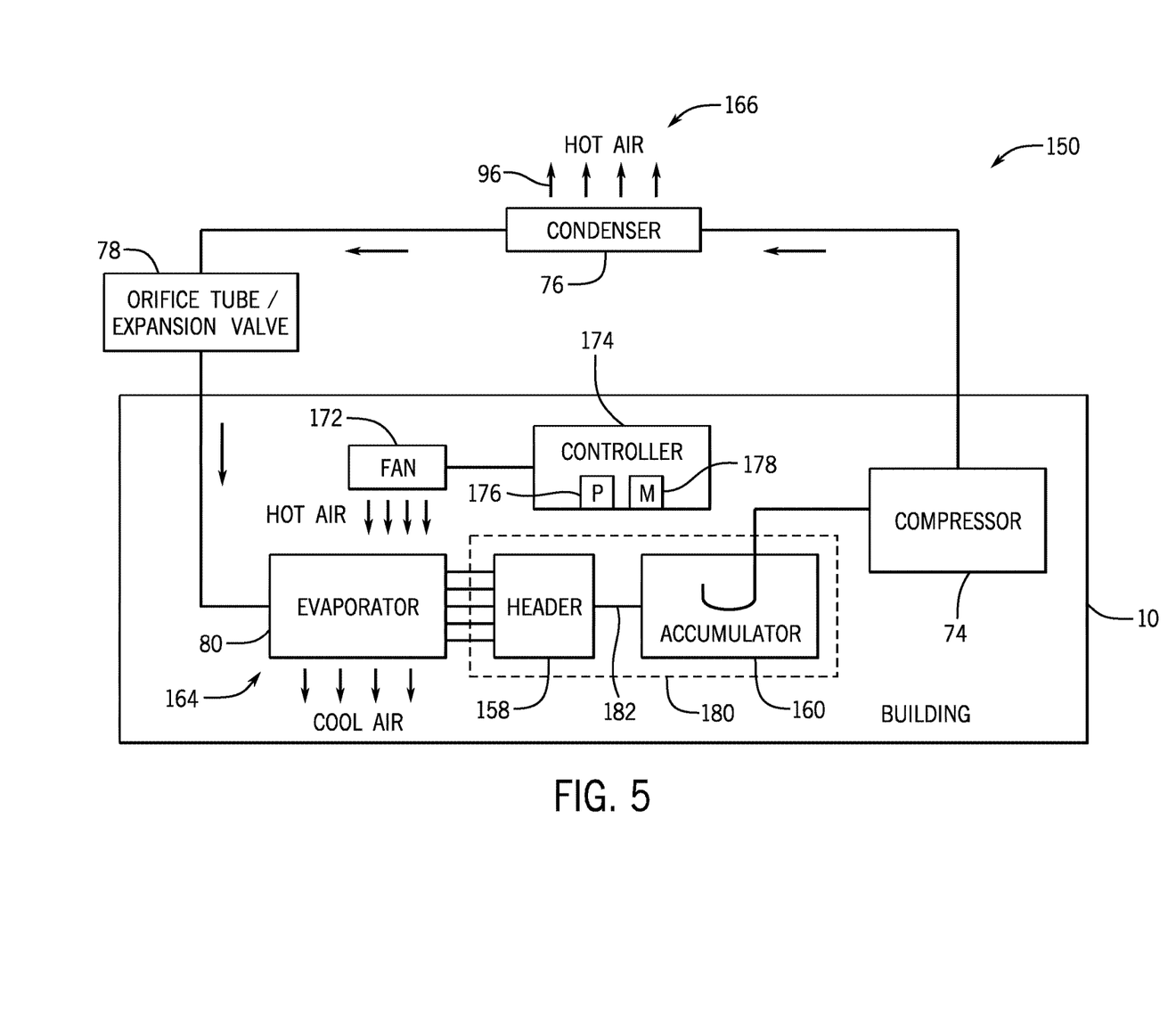
FIG. 5 is a block diagram of a refrigeration system of the HVAC&R system of FIG. 1, in accordance with an aspect of the present disclosure.

FIG. 5 shows a block diagram of an example of a refrigeration system 150 that may be used in the vapor compression system 72 described above. In the illustrated embodiment, the refrigeration system 150 includes the condenser 76, the expansion device 78 (e.g., orifice tube/ expansion valve), the evaporator 80, a suction header 158, an accumulator 160, and the compressor 74. As mentioned above, the condenser 76 receives a fluid, such as a refrigerant, in a gaseous state. The condenser 76 may cool and condense the refrigerant into a liquid state. Further, the condenser 76 may enable heat from the refrigerant to transfer to the environmental air 96. The expansion device 78 may control an amount of refrigerant that flows into the evaporator 80, thereby controlling superheat at an outlet of the evaporator 80.

The evaporator 80 receives the liquid refrigerant from the expansion device 78. The evaporator 80 evaporates the refrigerant from a liquid into a vapor. For example, heat from a heat source may be applied to the refrigerant to evaporate the liquid refrigerant into the vapor. By having the liquid refrigerant absorb heat in the evaporator 80, heat may be removed from the surrounding area, thereby creating cool air proximate to the evaporator 80, such as an air flow passing across the evaporator 80. The evaporator 80 directs the liquid refrigerant to a suction header 158. The evaporator 80 may include multiple refrigeration circuits that each have an outlet. The suction header 158 includes inlets to receive flows of the refrigerant from each of the outlets of the evaporator 80. The suction header 158 may merge the one or more flows of the refrigerant and forward the flow to the accumulator 160.

The accumulator 160 is coupled between the evaporator 80 and the compressor 74. The accumulator 160 may reduce or otherwise block liquid refrigerant exiting the evaporator 80 from exiting the accumulator 160 and entering the compressor 74. As the compressor 74 may be designed to compress vapor refrigerant, allowing liquid refrigerant to enter the compressor 74 may cause reduced performance or degradation of the compressor 74.

The accumulator 160 ensures that the amount of liquid refrigerant entering the compressor 74 from the evaporator 80 is limited or eliminated.

The compressor 74 receives the vapor refrigerant and compresses the vapor refrigerant from a lower pressure to a higher pressure causing the temperature of the vapor refrigerant to rise. As such, refrigeration system 150 may absorb heat into the refrigerant at a first location 164 (e.g., an air handler, an air duct, building supply air flow, inside the building 10, etc.) proximate to the evaporator 80 and expel the heat at a second location 166 (e.g., outside the building 10) to cool the first location 164 (e.g., inside the building 10).

In certain embodiments, the refrigeration system 150 may include a fan 172. In this example, the fan 172 is electrically coupled to a controller 174. The controller 174 may include a processor 176 operatively coupled to memory 178 to execute software, such as software for controlling the fan 172. Moreover, the processor 176 may include multiple processors, one or more "general-purpose" microprocessors, one or more special-purpose microprocessors, and/or one or more application specific integrated circuits (ASICS), or some combination thereof. For example, the processor 176 may include one or more reduced instruction set (RISC) processor, advanced RISC machine (ARM) processor, performance optimization with enhanced RISC (PowerPC) processor, field-programmable gate array (FPGA) integrated circuit, graphics processing unit (GPU), or any other suitable processing device.

The memory 178 may include a volatile memory, such as random access memory (RAM), nonvolatile memory, such as read-only memory (ROM), flash memory, or any combination thereof. The memory 178 may store a variety of information that may be used for various purposes. For example, the memory 178 may store processor-executable instructions (e.g., firmware or software) for the processors 176 to execute, such as instructions for controlling the fan 172.

The processor 176 may execute instructions to send signals to the fan 172 to control the fan 172 to control heat transfer with respect to the evaporator 80. For example, to move more hot air towards the evaporator 80, the processor 176 may send a signal instructing the fan 172 to increase a speed at which the fan 172 operates. While control of the fan 172 is described in detail, this is meant to be an example, and any suitable method of controlling transfer of heat with respect to the evaporator 80 may be used.

In some embodiments, the accumulator 160 may be separate pieces that are coupled to one another. That is, the accumulator 160 may include a single inlet that is coupled to a single outlet of the suction header 158, and the accumulator 160 may be coupled to a single inlet of the compressor 74. However, having separate pieces for the accumulator 160 and the suction header 158 may increase complexity of the system and increase costs of the system due to the additional connection between the suction header 158 and the accumulator 160. Further, the additional connection may result in increased superheat used in the refrigeration system 150 caused by additional spacing used with separate components.

As such, the suction header 158 and the accumulator 160 may be combined into a single body or unit as described below. A combined suction header and accumulator unit 180 may protect the compressor 74 from receiving liquid refrigerant that was not evaporated during the refrigeration process. Further, the outlet state of the refrigerant leaving the evaporator 80 is typically superheated to protect the compressor 74. By integrating the accumulator 160 and the suction header 158 together, the combined suction header and accumulator unit 180 may ensure that the compressor 74 is protected but also allow the superheat value from the evaporator 80 to be lowered, thereby improving performance. That is, the processor 176 may send a signal instructing the fan 172 to operate at a lower operating setpoint due to the combined suction header and accumulator unit 180 than a system that does not include a combined suction header and accumulator unit 180 (e.g., a separate suction header with a separate suction accumulator). Moreover, the combined suction header and accumulator unit 180 may decrease complexity of the refrigeration system 150 as well as reduce costs in manufacturing the combined suction header and accumulator unit 180. For instance, by combining the suction header 158 and the accumulator 160, the combined suction header and accumulator unit 180 may operate without a connecting pipe 182 between the suction header 158 and the accumulator 160.

Figure 6:
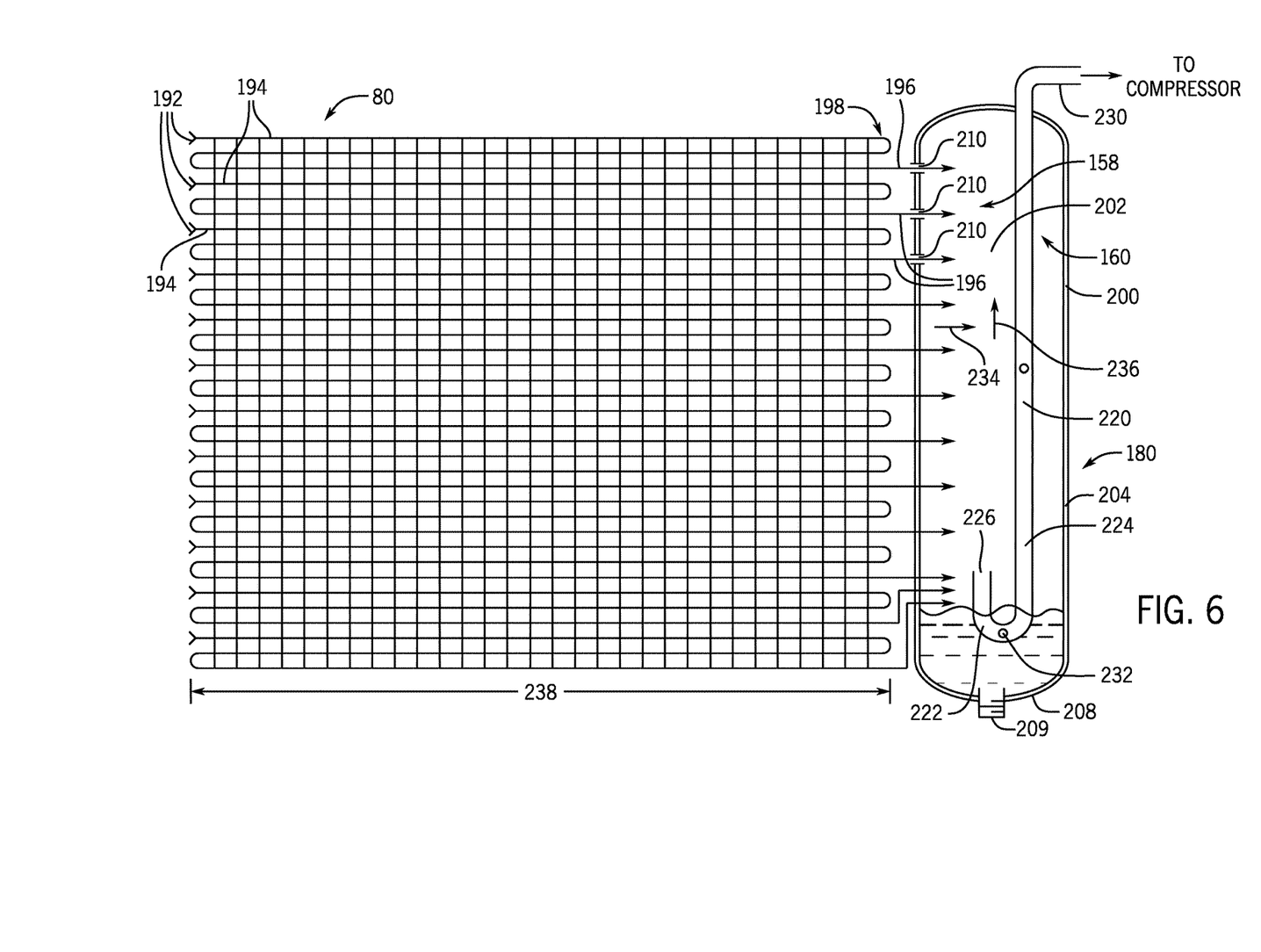
FIG. 6 is a schematic diagram of a combined suction header and accumulator in the refrigeration system of FIG. 5, in accordance with an aspect of the present disclosure.

FIG. 6 is a schematic diagram of the combined suction header and accumulator unit 180 of FIG. 5 mounted to an evaporator 80. While the refrigeration system 150 described above is used as an example, embodiments of the present disclosure may be included in any suitable refrigeration system that includes an evaporator and a compressor. The evaporator 80 may include one or more refrigerant inlets 192 that receive the refrigerant from the refrigeration system 150. The evaporator 80 may include one or more refrigeration circuits 194 that route the received refrigerant proximate to heat from a heat source (e.g., surrounding air flowing across the evaporator 80) to heat the refrigerant from a liquid into a vapor and remove heat from the heat source. While the illustrated embodiment of the evaporator 80 includes twelve refrigeration circuits 194, any suitable number of refrigeration circuits 194 may be used. Each of the refrigeration circuits 194 includes generally parallel piping. The evaporator 80 may include one or more evaporator outlets 196 that provide the refrigerant to the combined suction header and accumulator unit 180. The combined suction header and accumulator unit 180 may be coupled to a refrigerant exit side 198 of the evaporator 80.

The combined suction header and accumulator unit 180 has a body 200 that includes a shell 204, which encloses an interior volume 202. The shell 204 may include inlets 210 of a suction header 158 and a U-shaped pipe 220 of the accumulator 160 in the same body 200. A first side 222 of the U-shaped pipe 220 is shorter than a second side 224 of the U-shaped pipe 220. For example, the U-shaped pipe 220 may include a first end (e.g., pipe inlet 226) of the first side 222 disposed within the interior volume 202 of the body 200 and a second end (e.g., pipe outlet 230) of the second side 224 disposed external to the interior volume 202 of the body 200. The first side 222 may receive the vapor refrigerant and/or liquid refrigerant through a pipe inlet 226 at an end of the first side 222 of the U-shaped pipe 220. The vapor refrigerant may pass through the U-shaped pipe 220 and exit the combined suction header and accumulator unit 180 to the compressor 74. Further, the liquid refrigerant may settle at a base 208 of the combined suction header and accumulator unit 180. The second side 224 of the U-shaped pipe 220 may then limit or prevent liquid refrigerant that settled at the base 208 from passing to the compressor 74. In some embodiments, the combined suction header and accumulator unit 180 may include a fitting 209 on the base 208 to drain oil back to the compressor to prevent the oil from getting stuck in the accumulator.

Each of the inlets 210 of the combined suction header and accumulator unit 180 may be coupled to the respective evaporator outlets 196 of each refrigeration circuit 194 to mount the combined suction header and accumulator unit 180 to the evaporator 80. For example, each of the inlets 210 may include a respective aperture in the shell 204 that is configured to receive a respective evaporator outlet 196. Further, each inlet 210 may couple to the respective evaporator outlet 196 using any suitable method, such as fasteners, press fit, interference fit, friction fit, a braze or weld, and so forth. Further, the combined suction header and accumulator unit 180 may be designed with a total number of inlets 210 that corresponds to the total number of evaporator outlets 196 of the evaporator 80.

The inlets 210 may allow the combined suction header and accumulator unit 180 to merge the one or more flows of the refrigerant within the interior volume 202 of the body 200. Further, because the U-shaped pipe 220 and the inlets 210 are part of the same body 200, the combined suction header and accumulator unit 180 may both merge the flows of the refrigerant from each of the refrigeration circuits 194 and protect the compressor 74 using the single body 200. This may allow for easier coupling of the combined suction header and accumulator unit 180 to the evaporator 80 and compressor 74. Further, because the single body 200 may allow for fewer couplings of components, the U-shaped pipe 220 may be spaced closer to the evaporator 80, thereby resulting in a more efficient process.

That is, by packaging the suction header 158 and the accumulator 160 as a single unit in the same body 200, the combined suction header and accumulator unit 180 may protect the compressor 74 from liquid refrigerant. Because the combined suction header and accumulator unit 180 is mounted downstream of the evaporator 80 as one unit, the combined suction header and accumulator unit 180 may improve performance by allowing the evaporator 80 and/or the fan 172 to operate at a setpoint at which the liquid refrigerant is evaporated into a vapor immediately prior to exiting the refrigerant circuits 194. For example, the evaporator 80 may cause most of the liquid refrigerant to evaporate prior to passing through an evaporator outlet 196 but not substantially before the liquid refrigerant passes through the evaporator outlet 196.

The U-shaped pipe 220 of the accumulator 160 blocks the liquid refrigerant from exiting a pipe outlet 230 of the combined suction header and accumulator unit 180. In some embodiments, the U-shaped pipe 220 may include a bleed orifice 232 (e.g., oil equalization port) that operates to bleed liquid refrigerant into the base 208 to prevent the liquid refrigerant from exiting the pipe outlet 230 to control the rate of flow of the refrigerant to the compressor 74. The bleed orifice 232 is formed in a bend of the U-shaped pipe 120. In the illustrated embodiment, the accumulator 160 is positioned in a vertical orientation relative to a base 238 of the evaporator 80. The combined suction header and accumulator unit 180 may receive the refrigerant from the inlets 210 in a first direction 234 (e.g., horizontal direction), and the accumulator 160 may prevent or limit, via the bleed orifice 232, the flow of liquid refrigerant to the pipe outlet 230 via the U-shaped pipe 220 in a second direction 236 (e.g., vertical direction), substantially orthogonal to the first direction 234. While a vertical orientation is described above, any suitable orientation in which the U-shaped pipe 120 is positioned with the outlet 130 above an expected amount of liquid refrigerant in the suction accumulator. Further, the vapor refrigerant may reach the compressor 74 via the pipe inlet 226 due to the velocity of the vapor refrigerant as the vapor refrigerant passes through the combined suction header and accumulator unit 180 (e.g., from the inlet 210 to the pipe inlet 226 and into the pipe outlet 230). The vapor refrigerant may force the liquid refrigerant out via the bleed orifice 232 due to the pressure of the vapor refrigerant to prevent liquid refrigerant from reaching the compressor 74.

Figure 7:
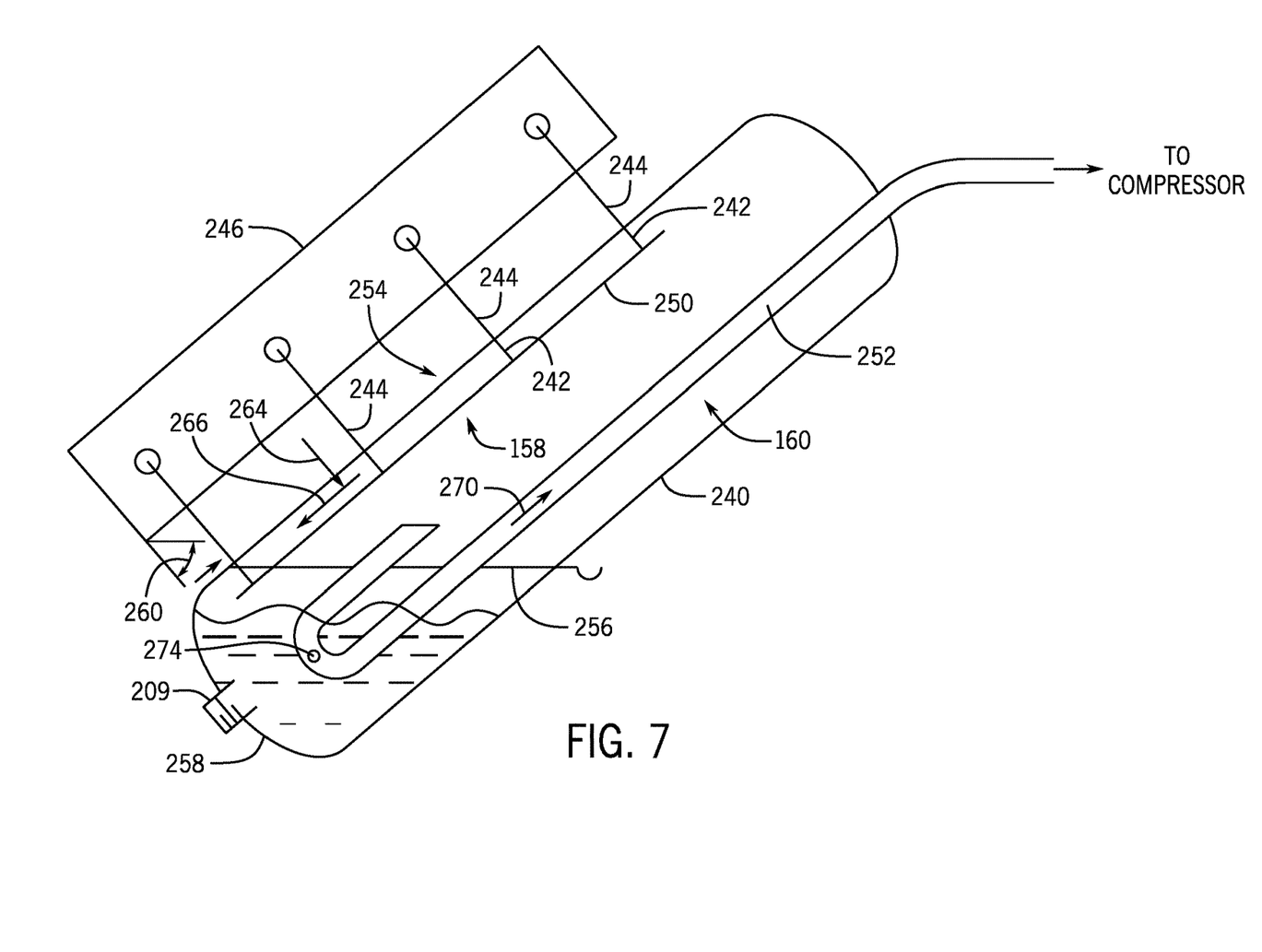
FIG. 7 is a schematic diagram of a combined suction header and accumulator in the refrigeration system of FIG. 5, in accordance with an aspect of the present disclosure.

FIG. 7 is a schematic diagram of an embodiment of a combined suction header and accumulator unit 240 in a non-vertical orientation. The combined suction header and accumulator unit 240 includes one or more inlets 242 that receive the refrigerant from respective evaporator outlets 244 of an evaporator 246. The combined suction header and accumulator unit 240 includes tubing 250 (e.g., piping) that directs the flow of the refrigerant towards a bottom of a U-shaped pipe 252 by routing the tubing 250 along a first side 154 of the combined suction header and accumulator unit 240. The refrigerant from each of the evaporator outlets 244 may merge together via the tubing 250 along the first side 254. Further, the combined suction header and accumulator unit 240 may include a baffle 256 that limits an amount of refrigerant liquid in a base 258 of the suction header and accumulator unit 240 to a predetermined amount to block an overflow of liquid refrigerant, thereby further blocking liquid refrigerant from passing on to the compressor 74. For example, the baffle 256 may be a piece of metal (e.g., copper) that is brazed to the walls of the combined suction header and accumulator unit 240. The tubing 250 and the U-shaped pipe 252 may guide the refrigerant and force any liquid refrigerant into the base 258 of the combined suction header and accumulator unit 240. The tubing 250 and the U-shaped pipe 252 may be brazed around the baffle holes such that liquid would be contained at the level of the baffle 256.

In some embodiments, the evaporator 246 and the combined suction header and accumulator unit 240 are positioned at a common angle relative to horizontal. The common angle may be between approximately 30 degrees and 75 degrees. In the illustrated embodiment, the combined suction header and accumulator unit 240 is positioned at approximately a 45-degree downward angle 260 from horizontal. While a 45-degree angle is given as an example, the combined suction header and accumulator unit 240 may be designed to operate at any suitable angle. For example, in an embodiment where the evaporator 246 has an A-frame configuration, the combined suction header and accumulator unit 240 may be disposed at an angle 260 of 30, 35, 40, 45, 50, 55, or 60 degrees relative to horizontal.

Liquid refrigerant may collect at the base 258 of the combined suction header and accumulator unit 240, parallel to horizontal. For example, the refrigerant may exit the evaporator 246 at the 45 degree downward angle in the direction 264 and be redirected from the direction 264 to a direction 266 towards the base 258 via the tubing 250. Further, the refrigerant may collect at the base 258 of the combined suction header and accumulator unit 240 and settle parallel to horizontal. The liquid refrigerant collecting at the base 258 may be evaporated over time and exit towards the compressor 74. The bleed orifice 274 may reduce or eliminate liquid refrigerant from passing to the compressor to an amount of liquid refrigerant that the compressor 74 is designed to withstand. For example, the liquid refrigerant may be limited through the U-shaped pipe 252 based on a size of the bleed orifice 274. The refrigerant may then proceed to exit the combined suction header and accumulator unit 240 in the direction 270, substantially orthogonal to the direction 264. While the suction header and accumulator unit 240 is positioned at an angle, the combined body may still merge the refrigerant as well as protect the compressor 74 from liquid refrigerant.

Accordingly, the present disclosure is directed to a combined suction header and accumulator unit 180 and 240. Combining the suction header and suction accumulators of the refrigeration system 150 reduce complexity of the refrigeration system 150 and increases efficiency by allowing the evaporator 80 and 246 to operate at a point at which most or all of the refrigerant exits the evaporator 80 and 246 as a vapor while allowing the superheat value to be lowered. For example, fans 172 that move air through the evaporator 80 and 246 may operate at a lower speed, thereby improving efficiency. Moreover, having the combined suction header and accumulator unit 180 and 240 included in the same body may simplify replacement and/or maintenance due to fewer components and/or component connections in the refrigeration system 150. The combined suction header and accumulator unit 180 and 240 may include a suction header 158 that receives a refrigerant from evaporator outlets 196 and 244. The suction header 158 may merge the refrigerant from each of the evaporator outlets 196 and 244. Further, the combined suction header and accumulator unit 180 and 240 may include an accumulator having a U-shaped pipe 220 and 252. The U-shaped pipe 220 and 252 may block flow of liquid refrigerant from entering the compressor 74. Further the combined suction header and accumulator unit 180 and 240 may save space and improve packaging of an HVAC&R system by limiting a number of components and/or connections included in the HVAC&R system.

While only certain features and embodiments of the present disclosure have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the embodiments, all features of an actual implementation may not have been described (i.e., those unrelated to the presently contemplated best mode of carrying out the disclosure, or those unrelated to enabling the claimed features). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A combined suction header and accumulator unit for a refrigeration system, comprising:
a shell comprising a first inlet configured to be fluidly coupled to a first evaporator outlet and a second inlet configured to be fluidly coupled to a second evaporator outlet to enable refrigerant to flow from an evaporator into the combined suction header and accumulator unit;
an accumulator pipe comprising a pipe inlet disposed within the shell and a pipe outlet configured to be fluidly coupled to a compressor to enable a vapor portion of the refrigerant to flow from the combined suction header and accumulator unit to the compressor; and
a baffle brazed to an interior surface of the shell and around the accumulator pipe, wherein:
the baffle is configured to block a liquid portion of the refrigerant from flowing from a base of the shell into the pipe inlet of the accumulator pipe; and
the baffle is non-perpendicular to a longitudinal axis of the shell.

2. The combined suction header and accumulator unit of claim 1, comprising tubing disposed within the shell, wherein:
the tubing is fluidly coupled to the first inlet and the second inlet of the combined suction header and accumulator unit;
the tubing extends below the baffle; and
the baffle is brazed around the tubing.

3. The combined suction header and accumulator unit of claim 2, wherein the tubing is configured to be guide the liquid portion of the refrigerant received from the first inlet, the second inlet, or both to the base of the shell.

4. The combined suction header and accumulator unit of claim 1, wherein the baffle is configured to block the liquid portion of the refrigerant from overflowing into the compressor.

5. The combined suction header and accumulator unit of claim 1, wherein the baffle is brazed around the accumulator pipe below the pipe inlet of the accumulator pipe.

6. The combined suction header and accumulator unit of claim 1, wherein the accumulator pipe comprises a bleed orifice configured to meter a flow of the liquid portion of the refrigerant from the accumulator pipe into the base of the shell.

7. The combined suction header and accumulator unit of claim 6, wherein:
the accumulator pipe comprises a U-shaped pipe: and
the bleed orifice aperture is formed in a bend of the U-shaped pipe below the baffle.

8. A vapor compression system, comprising:
an evaporator comprising a plurality of evaporator outlets configured to output refrigerant comprising a vapor portion;
a compressor configured to compress the vapor portion of the refrigerant; and
a combined suction header and accumulator unit fluidly coupled between the evaporator and the compressor, wherein the combined suction header and accumulator unit comprises:
a shell comprising a base configured to accumulate liquid portion of the refrigerant;
a plurality of inlets formed in the shell, wherein each of the plurality of inlets is fluidly coupled to a corresponding evaporator outlet of the plurality of evaporator outlets;
tubing disposed within the shell and fluidly coupled to each of the plurality of inlets, wherein the tubing is configured to guide the liquid portion of the refrigerant received from the plurality of inlets toward the base of the shell;
a U-shaped pipe comprising a pipe inlet disposed within the shell and a pipe outlet fluidly coupled to the compressor; and
a baffle coupled to an interior surface of the shell, around the U-shaped pipe, and around the tubing, wherein:
the baffle is configured to block the liquid portion of the refrigerant accumulated in the base of the shell from overflowing into the compressor; and
the baffle is non-perpendicular to a longitudinal axis of the shell.

9. The vapor compression system of claim 8, wherein the baffle is coupled around the U-shaped pipe below the pipe inlet to block the liquid portion of the refrigerant from flowing from the base of the shell into the pipe inlet.

10. The vapor compression system of claim 8, wherein the tubing is parallel to the longitudinal axis of the shell.

11. The vapor compression system of claim 8, wherein the combined suction header and accumulator unit is configured to be positioned such that the longitudinal axis of the shell is between approximately 30 degrees and 75 degrees relative to horizontal.

12. The refrigeration vapor compression system of claim 8, wherein:
the evaporator comprises an A-frame heat exchanger; and
the combined suction header and accumulator unit is positioned parallel to an output-side of the A-frame heat exchanger.

13. A refrigeration system, comprising:
an evaporator comprising a plurality of evaporator outlets configured to output refrigerant comprising a vapor portion; and
a body comprising:
a shell, wherein the shell comprises a plurality of inlets each fluidly coupled to a corresponding evaporator outlet of the plurality of evaporator outlets;
tubing disposed within the shell, wherein the tubing is fluidly coupled to each of the plurality of inlets and extends to a base of the shell; and
a baffle coupled around the tubing within the shell, wherein:
the baffle is configured to block a liquid portion of the refrigerant from overflowing out of the base of the shell; and
the baffle is non-orthogonal to a longitudinal axis of the shell.

14. The refrigeration system of claim 13, wherein:
the body comprises a U-shaped pipe disposed within the shell; and
the baffle is coupled around the U-shaped pipe.

15. The refrigeration system of claim 14, wherein:
the U-shaped pipe comprises a pipe inlet disposed within the shell; and the baffle is configured to block the liquid portion of the refrigerant from flowing from the base of the shell into the pipe inlet of the U-shaped pipe.

16. The refrigeration system of claim 13, wherein the tubing is configured to direct the liquid portion of the refrigerant received from the plurality of inlets toward the base of the shell.

17. The refrigeration system of claim 13, wherein the tubing and the baffle are non-orthogonal.

18. The refrigeration system of claim 13, wherein the tubing is parallel to the longitudinal axis of the shell.

19. The refrigeration system of claim 13, wherein:
the evaporator comprises an A-frame heat exchanger; and
the body is positioned parallel to an output-side of the A-frame heat exchanger.

* * * * *